US007325728B2

(12) United States Patent
Arora et al.

(10) Patent No.: US 7,325,728 B2
(45) Date of Patent: Feb. 5, 2008

(54) REMOTE DIAGNOSIS AND REPAIR OF VENDING MACHINE COMMUNICATION FAILURES

(75) Inventors: Mandeep S. Arora, Danville, CA (US); Fred Cheng, Aliso Viejo, CA (US); Anant Agrawal, Diamond Bar, CA (US); A. Louis Beaudoin, Oakland, CA (US); Eric M. Chu, Laguna Niguel, CA (US)

(73) Assignee: Cantaloupe Systems, Inc., Berkeley, CA (US)

( * ) Notice: Subject to any disclaimer, the term of this patent is extended or adjusted under 35 U.S.C. 154(b) by 175 days.

(21) Appl. No.: 11/096,985

(22) Filed: Mar. 31, 2005

(65) Prior Publication Data

US 2006/0219777 A1 Oct. 5, 2006

(51) Int. Cl.
*G06F 7/08* (2006.01)

(52) U.S. Cl. ...................................... 235/381; 235/383

(58) Field of Classification Search ................ 235/381, 235/383; 340/5.9, 545.1; 700/231, 236
See application file for complete search history.

(56) References Cited

U.S. PATENT DOCUMENTS 5,959,869 A 9/1999 Miller et al.
6,038,491 A 3/2000 McGarry et al.
6,339,731 B1 1/2002 Morris et al.
6,457,038 B1 9/2002 Defosse
6,505,095 B1 1/2003 Kolls
6,741,910 B1 5/2004 Yamazaki
6,900,720 B2 * 5/2005 Denison et al. .............. 340/5.9
6,917,853 B2 * 7/2005 Chirnomas .................. 700/244
6,980,887 B2 * 12/2005 Varga et al. ................ 700/236
2002/0156727 A1 10/2002 LeVake et al.
2003/0074106 A1 * 4/2003 Butler ........................ 700/236
2003/0101257 A1 5/2003 Godwin
2003/0150907 A1 * 8/2003 Metcalf et al. ............. 235/375
2003/0158625 A1 8/2003 Carstens et al.
2004/0114557 A1 6/2004 Bryan et al.
2004/0133653 A1 7/2004 Defosse et al.
2004/0186620 A1 * 9/2004 Chirnomas .................. 700/231
2005/0088279 A1 * 4/2005 Denison et al. ............ 340/5.23

OTHER PUBLICATIONS

Kasavana, Michael L., "NAMA White Paper: Cashless Vending," The National Automatic Merchandising Association, 40 pages.

* cited by examiner

*Primary Examiner*—Ahshik Kim
(74) *Attorney, Agent, or Firm*—MacPherson Kwok Chen & Heid LLP

(57) ABSTRACT

An audit system for a vending machine system is provided. This audit system is configured to retrieve operational data, such as a DEX file, from a vending machine controller in the vending machine system. The audit system is further configured to store a communications log of the data transmitted between the vending machine controller and the audit system. This communications log can be used by an operator at a host system to assist in debugging communication errors between the audit system and the vending machine controller.

33 Claims, 3 Drawing Sheets

REMOTE DIAGNOSIS AND REPAIR OF VENDING MACHINE COMMUNICATION FAILURES

BACKGROUND

Vending machines have long been used for selling products to consumers. In the past, vending machine managers needed to send human operators to personally visit each vending machine in order to check on the status of the vending machine, to retrieve the collected cash, and to restock the vending machine with new products to replace the products that had been sold. Recently, these vending machines have been provided with electronic vending machine controllers (VMC), which control the operation of various components within the vending machine. In addition to providing control functionality, the VMC may also serve as a monitoring system for monitoring the status of the vending machine and for keeping track of product sales, inventory, and cash flow.

Even more recently, vending machines have been provided with audit systems capable of retrieving information regarding the status of the vending machine and transmitting the data to a central server, where the data can be processed and analyzed. This can assist the vending machine operator in scheduling service visits to the vending machine location. In many cases, existing vending machines are retrofitted with these types of audit systems, which retrieve the information regarding the vending machine from the VMC.

The National Automatic Merchandising Association (NAMA) has established a communication protocol for the electronic retrieval of machine-level transactions via data polling. This communication protocol is known as the Data Exchange Uniform Code Standard (DEX/UCS), typically referred to as DEX. The DEX protocol establishes standards governing data recordation, file formatting, and file exportation through common interfaces. Current vending machines are typically manufactured to communicate using the DEX protocol and are sometimes referred to as "DEX-compliant." DEX reporting provides a vending machine operator the ability to track brand and/or product preferences at the point of purchase, and can improve sales performance, reduce operating expenses, and minimize machine malfunctions.

Despite the advances in monitoring technology for vending machines, these audit systems are typically focused on merely retrieving information about the vending machine and transmitting that information to the host system. When there is an error in one component of the vending machine, the audit system may transmit a message to the host system describing the existence of the error, but the underlying cause of the error may be remain unclear. For example, if the audit system is unable to retrieve DEX information from the VMC, the audit system may transmit a message to the host system indicating that a communication error has occurred. It may then be necessary for service personnel to go into the field and examine the vending machine in order to determine the cause of the error.

Accordingly, it would be desirable to provide a vending machine audit system that improves an operator's ability to diagnose and repair problems remotely.

SUMMARY

In accordance with embodiments of the present invention, an audit system for a vending machine system is provided. This audit system is configured to retrieve operational data, such as a DEX file, from a vending machine controller in the vending machine system. The audit system is further configured to store a communications log of the data transmitted between the vending machine controller and the audit system. This communications log can be used by an operator at a host system to assist in debugging communication errors between the audit system and the vending machine controller.

In accordance with embodiments of the present invention, a method of operating a vending machine system comprising a vending machine controller (VMC) and an audit system is provided, said method comprising: storing a communications log of communications between the VMC and the audit system; and transmitting the communications log to a host system via a wide area network (WAN).

In accordance with other embodiments of the present invention, an audit system for a vending machine system is provided, comprising: an interface for communication with a vending machine controller (VMC); a control system configured to communicate with the VMC and to store a communications log of communications between the VMC and the audit system; and a communications interface for transmitting the communications log to a host system via a wide area network (WAN).

In accordance with other embodiments of the present invention, an audit system for a vending machine system is provided, comprising: an interface for communication with a vending machine controller (VMC); a control means for communicating with the VMC and for storing a communications log of communications between the VMC and the control means; and a communications means for transmitting the communications log to a host system via a wide area network (WAN).

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims of the issued patent.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

Figure 1:
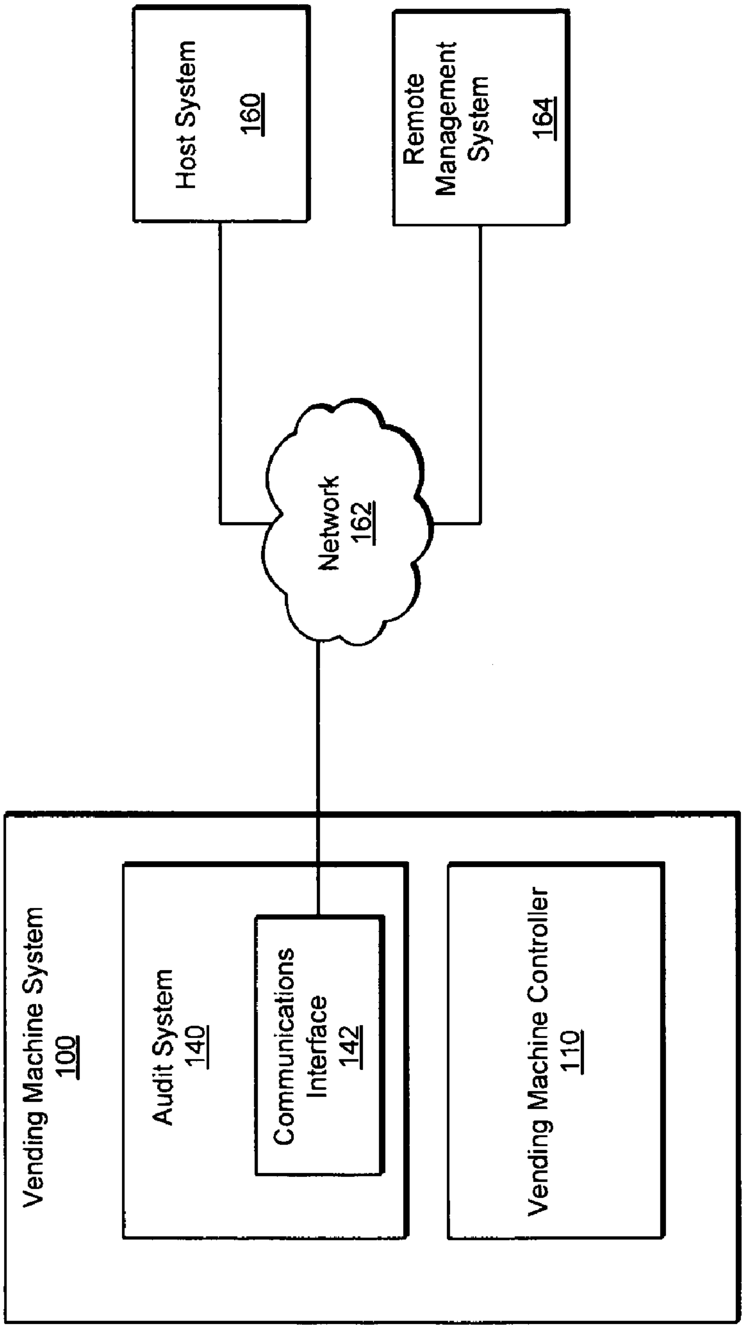
FIG. 1 is a block diagram of an arrangement for remotely diagnosing and repairing communication failures in a vending machine system, in accordance with embodiments of the present invention.

FIG. 1 is a block diagram of an arrangement for remotely controlling a vending machine system, in accordance with embodiments of the present invention. A vending machine system 100 is coupled to a host system 160 via a wide area network 162, such as the Internet. The vending machine system 100 comprises a vending machine controller (VMC) 110 and an audit system 140. The audit system 140 includes a communications interface 142 which provides a communications link to the network 162 and allows the audit system 140 to transmit operational data regarding the vending machine system 100 to the host system 160. This communications link may comprise, e.g., a wireless communications link. A remote management system 164 may also be provided to allow a user to access the operational data regarding the vending machine on host system 160 and to manage the operation of the vending machine system 100.

Figure 2:
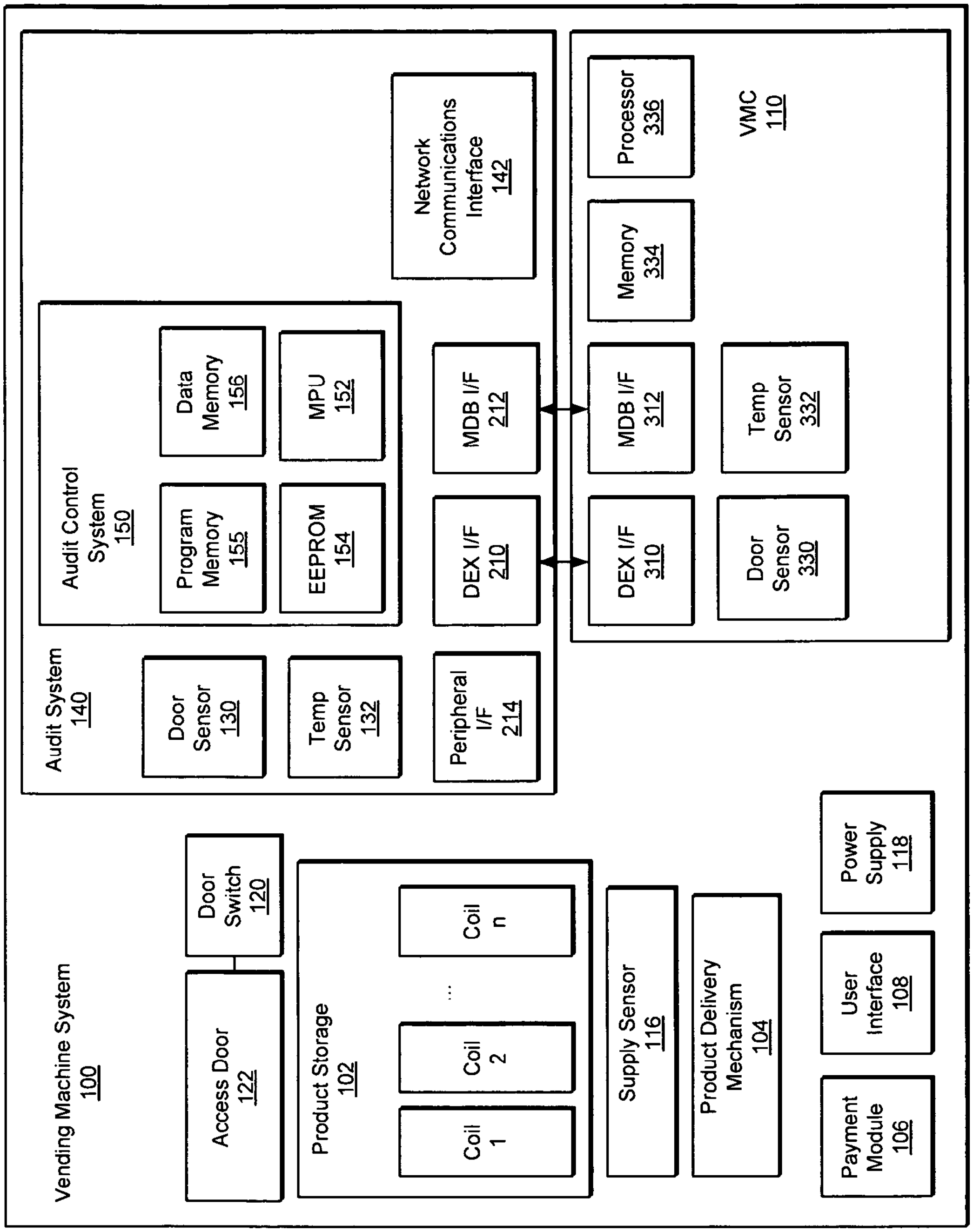
FIG. 2 is a more detailed block diagram of the vending machine system, in accordance with embodiments of the present invention.

FIG. 2 is a more detailed block diagram of the vending machine system 100, in accordance with embodiments of the present invention. The vending machine system 100 includes a product storage portion 102, which stores the various types of products to be sold by the vending machine system 100 in one or more product storage compartments. These product storage compartments are sometimes referred to as "coils", in reference to the coil-shaped wire often used in conventional vending machines to control the delivery of products to customers.

The vending machine system 100 also includes a payment module 106, which may be configured to receive payment from a user in various forms, including, e.g., bills, coins, credit card, debit card, smartcard, wireless authorization (e.g., via cell phone), or the like. A user interface 108 is provided for allowing a user to make product selections. Typically, the user interface 108 will include a plurality of buttons, each button corresponding to a particular type of product available for sale. In other embodiments, the user interface 108 will include a keypad or touchscreen for entering product selections. The payment module 106 and user interface 108 are coupled to the VMC 110, which controls the operation of the vending machine system 100. During normal use, when a user has provided sufficient payment via the payment module 106 and makes a product selection via the user interface 108, the VMC 110 activates a product delivery mechanism 104, which retrieves the selected product from the appropriate product storage compartment and delivers the product to the user. One or more supply sensors 116 may be provided for monitoring the supply of products in the various coils. These supply sensors 116 may be configured to monitor the exact amount of product in each coil, to monitor when the supply of product in each coil reaches one or more predetermined monitoring levels (e.g., a restock warning level and an empty level), or to monitor when the supply of product in each coil is completely exhausted.

The vending machine 100 includes an access door 122 which is used by service personnel to restock the product storage portion 102, retrieve money from the payment module 106, download system and sales information from the VMC 110, make repairs, and perform other service-related duties. A door switch 120 engages the access door 122 such that the VMC 110 can detect when the access door 122 is opened.

The VMC 110 is configured to poll the various devices provided in the vending machine system 100 in order to determine the status of the system. For example, the VMC 110 continuously polls the payment module 106 to determine whether any money has been inserted into the system 100. When a customer inserts money into the payment module 106, the payment module 106 will respond to the VMC's polling with a message indicating the amount of money received. Once the appropriate amount of money is received from the customer and a selection is entered into the user interface 108, the processor 336 instructs the product delivery mechanism 104 to deliver the product corresponding to the customer's selection. The amount of cash received, the amount of change returned to the customer, and the product vended are stored in the memory 334 of the VMC 110. Thus, the VMC 110 is able to maintain a record of vending machine operational data, e.g. sales and cash.

In accordance with embodiments of the present invention, an audit system 140 is provided for monitoring the vending machine system 100. Although the audit system 140 may be provided as an integral component of the vending machine system 100, in many cases, the audit system 140 is a separate device that can be installed in an existing vending machine system 100. The audit system 140 comprises one or more interfaces for coupling the audit system 140 to other devices. This can be accomplished using, e.g., a serial interface, such as a DEX or MDB port, that communicates using a standard data protocol, such as DEX/UCS or MDB/ICP.

In the embodiment shown, the audit system 140 comprises a DEX interface 210 and a MDB interface 212, which couple to a corresponding DEX interface 310 and MDB interface 312 on the VMC 110. The DEX interface 210 comprises an interface which allows the coupled devices to communicate according to the DEX/UCS protocol. The physical connection provided by the DEX interface 210 may comprise a ¼ inch female socket. In this embodiment, the audit system 140 uses the DEX interface 210 to transmit and receive messages regarding operational data from the VMC 110. This may include requesting and receiving DEX files, as will be described in greater detail below.

The MDB interface 212 is an interface that complies with the standard established as the Multi-Drop Bus/Internal Communication Protocol (MDB/ICP), which is a serial bus interface for electronically controlled vending machines. The illustrated audit system 140 may use the MDB interface 212 to receive power from the power supply 118 via the VMC 110 and to interface with peripheral devices coupled to the VMC 110.

The audit system 140 may also be provided with a peripheral interface 214 for directly coupling the audit system 140 to peripheral devices without utilizing the VMC 110. This peripheral interface to 14 may comprise, e.g., a serial interface, such as the I2C interface.

The audit system 140 may also include a door sensor 130, which is used to detect the state of the access door 122 for the vending machine system 100, and a temperature sensor 132, which is used to detect the temperature within the vending machine system 100 and/or within the product storage portion 102. The VMC 110 may also include separate a door sensor 330 for detecting the state of the access door 122 and a temperature sensor 332 for detecting the vending machine system 100. The redundant door and temperature sensors may be desirable if the audit system 140 requires a higher level of sensitivity or reliability in its sensors 130, 132 than the existing sensors 330, 332 provided by the VMC 110. In addition, some retrofitted audit systems 140 may have difficulty retrieving door sensor and temperature sensor information from some vending machine controllers which are unresponsive to standard commands requesting door and temperature information.

The audit system 140 also comprises an audit control system 150, which implements the control logic for operation of the audit system 140. The audit control system 150 comprises a processor, shown as MPU 152, which can be, e.g., an AVR ATmega128 microcontroller by the Atmel Corporation of San Jose, Calif. The audit control system 150 may also be provided with one or more memory devices. In the embodiment shown, the audit control system 150 comprises an EEPROM 154, a flash memory 155, and a data memory 156. The EEPROM 154 may be used to store settings for the operational parameters of the audit system 140. The flash memory 155 may be used to store program data for execution by the MPU 152. The data memory 156 may comprise an SRAM memory for storing operational data retrieved from the VMC 110. In the AVR ATmega128 microcontroller, these memory devices are incorporated into the microcontroller. In other systems, the memory devices may be provided in separate devices.

The audit system 140 also comprises a communications interface 142 for coupling the audit system 140 to the network 162. The communications interface 142 may comprise any of a variety of types of communication interfaces, both wired and wireless. A wired interface may comprise any of a variety of well-known interfaces for coupling to wide-area networks via a wire, cable, fiber-optic, or other physical media for transmitting analog or digital data. A wireless interface may comprise any of a variety of well-known interfaces for establishing a wireless link to a wide-area network. The wireless interface may comprise a long-range wireless interface, such as a radio frequency (RF) modem for transmitting data using a variety of communication protocols, e.g., General Packet Radio Service (GPRS), Cellular Data Packet Data (CDPD), Code Division Multiple Access (CDMA), and Time Division Multiple Access (TDMA). In other embodiments, the communications interface 142 may comprise a short-range wireless interface using a short-range wireless protocol such as, e.g., IEEE 802.11 (WiFi), IEEE 802.15 (Bluetooth), and IrDA, as well as other types of RF transmissions, such as on the 900 MHz and 2.4 GHz frequencies. The short-range wireless interface may be provided for communicating with a base station receiver (not shown), which, in turn, is coupled to the wide-area network 162 for communication with the host system 160. The base station receiver may be used to provide wide-area network connectivity for a plurality of vending machine systems, which communicate with the base station receiver via the short-range wireless interfaces. This can serve to decrease the cost of the network connectivity provided in each vending machine system.

The host system 160 can communicate with the audit system 140 using a communication protocol, such as, e.g., User Datagram Protocol (UDP), File Transfer Protocol (FTP), Transmission Control Protocol (TCP), or the like, as would be understood by one of ordinary skill in the art.

The audit system 140 is configured to collect operational data from the VMC 110. This operational data may comprise information regarding sales (e.g., a coil name, unit price, cumulative sales total, and cumulative cash total), cash collection (e.g., "cash in": total cash inserted into the vending machine; "cash out": total cash output by the vending machine as change; "bills to stacker": total bills that are in the bill stacker; "coin to box": total coins that are in the coin box; "tube cash": total cash transferred to the coin tubes; "card cash": total "cashless" monetary value received by the vending machine), temperature, etc. In vending machine systems utilizing the DEX protocol, the audit system 140 collects operational data by requesting a DEX file from the VMC 110.

Under the DEX standard, the VMC generates an audit report file which includes information regarding the operation of the vending machine. This audit report comprises an ASCII text file including a series of lines containing audit information. The audit report also includes a header, a trailer, and a redundancy check, such as a checksum. Each line in the audit report file begins with an identifier, such as ID1, CA2, CA3, etc. The identifier identifies the type of data the line will provide. Each data field in each line is delimited by an asterisk (*). The DEX standard also provides a standard by which the VMC can receive DEX files from an audit system.

The audit system 140 stores a set of data collection parameters which are the settings which govern the collection of operational data by the audit system 140. In the illustrated embodiment, the audit control system 150 is configured to interrogate the VMC 110 to request predetermined types of operational data. This interrogation occurs on a predetermined interrogation schedule. For example, the audit control system 150 may be configured to interrogate the VMC 110 to retrieve "cash in" and sales information every 10 minutes.

In order to transmit operational information regarding the vending machine system 100, the audit system 140 is configured to transmit reports to the host system 160 via the network 162. In accordance with some embodiments, the audit system 140 transmits three types reports: scheduled reports, alert reports, and on demand reports.

The scheduled reports provide a predetermined set of operational data to the host system 160 on a scheduled, periodic basis. The scheduled reports may include operational data retrieved from a plurality of interrogations. For example, the audit control system 150 may be configured to transmit a sales report once per day. This sales report would include the operational data collected from all the DEX interrogations over the previous 24 hours.

The alert reports provide a predetermined set of operational data in response to the detection of an alert condition in the vending machine system 100. The audit control system 150 may be configured to immediately transmit one or more alert reports in response to detection of various alert conditions. For example, if the temperature sensor 132 detects that the temperature within the vending machine system 100 has passed beyond a predetermined acceptable range of temperatures, the audit control system 150 will immediately transmit a temperature alert informing the host system 160 of the situation. The audit control system 150 may also be configured to transmit a door alert if the door sensor 130 detects that the access door 122 has been opened.

The on demand reports provide a set of operational data in response to receipt of a request for that data from the host system. For example, the host system may transmit a query to the audit control system 150 requesting the current amount of cash available. If the audit control system 150 already has the requested data in the data memory 156, the audit control system 150 will immediately respond to the host system 160 with the requested data. If the data is not available, then the audit control system 150 will request the data from the appropriate device, such as, e.g., the VMC 110, and then will transmit that data to the requesting host system.

During normal operation, the audit system 140 executes code stored in the program memory 155 in order to successfully communicate with the VMC 110. This code includes DEX code governing the process by which the audit system 140 connects with the VMC 110 and retrieves DEX data. If all vending machine manufacturers strictly adhered to the DEX standard, an audit system 140 would be able to execute the same DEX code in order to perform the DEX process with all types of vending machines. In practice, however, vending machine manufacturers often do not conform with the DEX standard. Therefore, DEX code that enables an audit system to effectively communicate with a first type of vending machine may not work with another type of vending machine.

One approach for resolving this incompatibility problem is to provide the audit system with DEX code that enables the audit system to attempt to communicate with the VMC using a variety of different types of communication standards. A disadvantage of this approach is the difficulty of providing a single code base capable of communicating with all of the myriad types of VMCs. In addition, as new vending machines are placed on the market, the code base would need to be updated to include the communication standards for these new VMCs. Another disadvantage of this approach is that vending machine systems are typically taken offline when being interrogated by the audit system. Thus, an audit system that cycled through several attempts to communicate with a VMC would prevent customers from purchasing products from that vending machine system for extended periods of time. It would be desirable for the audit system to retrieve the desired DEX data as rapidly as possible in order to minimize downtime and maximize potential sales.

Figure 3:
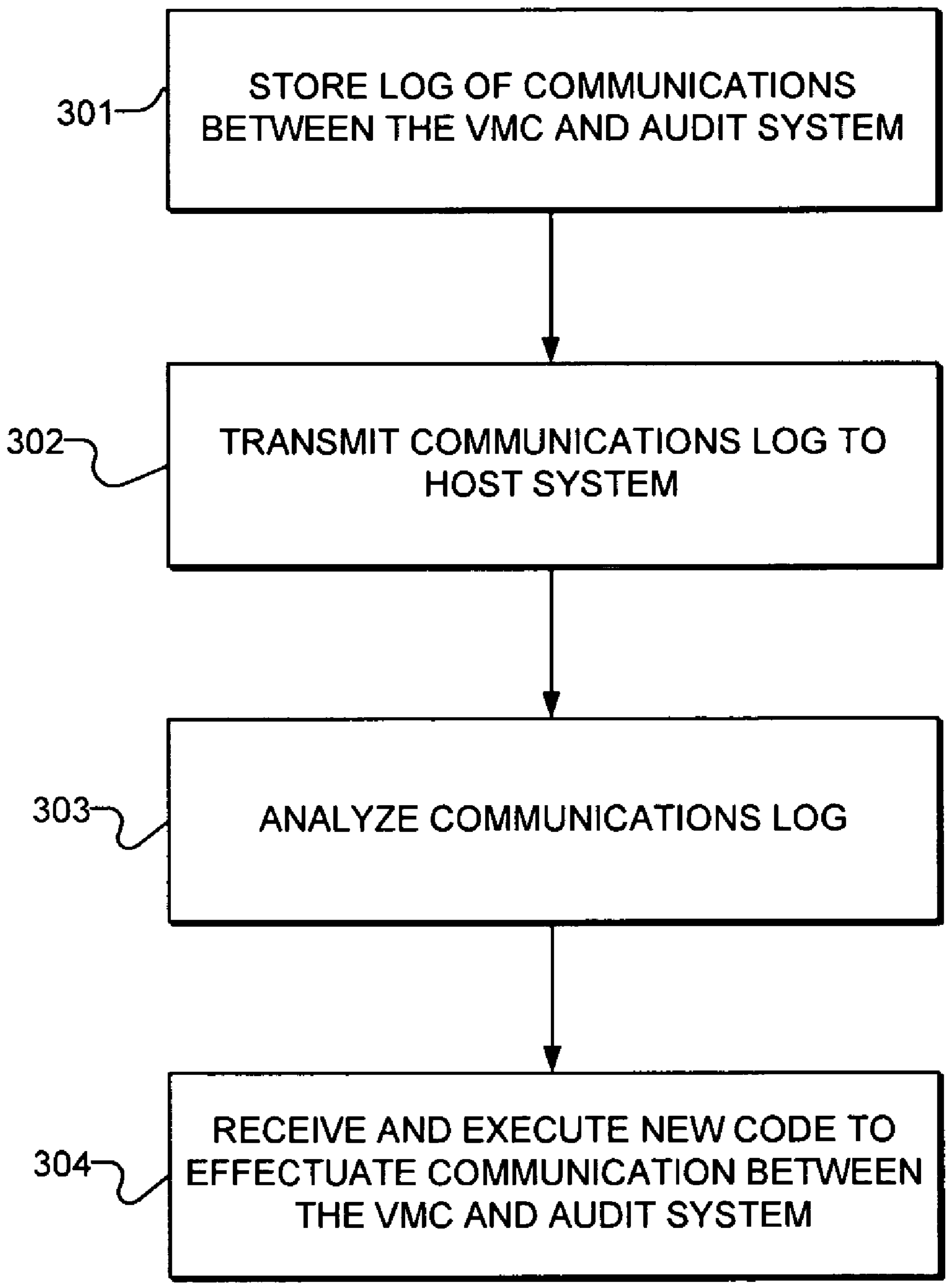
FIG. 3 is a flowchart illustrating a process of diagnosing and repairing vending machine communication failures using a communications log, in accordance with embodiments of the present invention.

In accordance with embodiments of the present invention, the audit system 140 is configured to store a communications log of communications between the VMC 110 and the audit system 150. FIG. 3 shows a process of diagnosing and repairing vending machine communication failures using the communications log. In step 301, the log of communications is stored. This log may comprise all of the data traffic between the VMC 110 and the audit system 150 over a period of time. For example, each time the audit system 150 attempts to communicate with the VMC 110, the communications log is stored. In other embodiments, the communications log is only stored after a communications failure has been detected. The next time the audit system 150 attempts to communicate with the VMC 110 after such a failure, the data traffic is stored. In yet other embodiments, the communications log is stored in response to a command issued by the host system 160. This command may be manually issued by an operator at the remote management system 164 or may be automatically issued by the host system 160 upon detection of an error.

In step 302, the communications log is transmitted to the host system 160. In the situation where the audit system 140 is incapable of properly communicating with the VMC 110, this communications log can be analyzed to determine the cause of the problem and to generate a solution.

In step 303, the communications log is analyzed. In some cases, the diagnosis can be performed by a computer, but in more complicated cases, it may be necessary for a human operator to manually review the communications log in order to troubleshoot the problem.

Once the problem is diagnosed, new DEX code can be transmitted to the audit system 140, where it can stored in, e.g., the program memory 155. In step 304, the audit system 140 can then execute the new DEX code in an attempt to successfully communicate with the VMC 110. In some cases, the new DEX code can be existing code, such as a software patch, known to resolve the problem currently being experienced. In other cases, new DEX code will need to be produced in order to resolve the problem.

The communication failures recorded by the communications log may occur at any point during the communication between the audit system 140 and the VMC 110. According to the DEX protocol, three handshake sequences are performed: a Master handshake, a Slave handshake, and a Data handshake. During the Master and Slave handshake sequences, the identity and roles of the two communicating devices are established. In the Data handshake, the DEX audit data is requested by the audit system 140 and a DEX file containing the requested audit data is provided by the VMC 110.

In one example, the DEX standard defines a timeout period for communications between the audit system and the VMC. If the audit system does not respond to a message from the VMC within the specified timeout period, the VMC will terminate the communication. If a vending machine manufacturer has programmed its VMC with a timeout period shorter than that expected by the audit system, each time the audit system attempts to communicate with the VMC, the attempted communication may be prematurely terminated. In accordance with embodiments of the present invention, all the data that is passed between the VMC and the audit system during these failed attempts at communicating are stored in the communications log. After this communications log is transmitted to the host system 160, a skilled administrator may be able to review the log and diagnose the problem. In response, the administrator may generate new DEX code that will configure the audit control system 150 to respond to the VMC 110 within the shortened timeout period. This DEX code would be transmitted to the audit system 140 via the network 162 and stored in the program memory 155, where it can be accessed for execution by the MPU 152.

Another exemplary situation in which the communications log may assist in the remote diagnosis and repair of communications failures arises when the VMC 110 generates DEX reports containing bad data. This bad data may take various forms. For example, under the DEX standard, the DEX report should contain only ASCII characters. However, a vending machine manufacturer may program the VMC to insert non-standard characters into the DEX report. When the audit control system 150 receives this DEX report from the VMC 110 and attempts to parse the data in the DEX report, the non-standard characters may cause the audit control system 150 to crash or otherwise fail to function properly. An examination of the communications log that recorded all the data passing between the VMC 110 in the audit system 140 during this exchange would reveal the presence of the non-standard characters. New DEX code capable of handling these non-standard characters can be downloaded to the audit control system 150 and used for future interrogations.

Yet another exemplary situation in which the communications log may assist in the remote diagnosis and repair of communications failures arises when the VMC 110 is operating improperly. For example, the code controlling the VMC 110 may include a bug which introduces erroneous data into the DEX file. Even though the VMC 110 and the audit system 140 may be designed to be compatible, the bug may prevent the devices from properly communicating. In this case, the communications log can be used to identify the erroneous data and determine that the defective messages from the VMC 110 are the source of the failures. One potential solution to this problem is to transmit new code for execution by the audit system 140 to enable the audit system 140 to interpret the VMC's defective messages. Another potential solution is to download code to the audit system 140, which is then transferred to the VMC 110. This new code when executed by the VMC 110 would enable the VMC 110 to communicate properly. Yet another potential solution is to have service personnel manually replace the EEPROM in the VMC 110 with an EEPROM containing corrected code.

The communications log may be stored in various ways. In accordance with embodiments of the present invention, the communications log is stored by the same audit system that is used to request and store the DEX files from the VMC. Thus, no other separate monitoring and recording devices are necessary. This storage can be performed in a variety of ways. For example, during a typical DEX process, various messages are passed between the audit system 140 and the VMC 110. These messages include handshake data and payload data, and the audit control system 150 may be configured under normal circumstances to store only the payload data, which comprises the DEX file from the VMC 110. Once the connection is established, the handshake data may be discarded and need not be transmitted to the host system.

When it is desired to store a communications log, a flag in the audit control system 150 is set to cause the audit control system 150 to enter into a "debug" mode in which all of the data passing between the VMC 110 and the audit system 140 are stored in a communications log, not just DEX file payload data. In order to improve the ease with which the communications log is analyzed, the audit control system 150 may further be configured to record the communications data such that the sender of the data is identified. For example, each message or line in the communications log may include a flag indicating whether the message or line was transmitted by the VMC 110 or the audit system 140. These indications will enable an operator at the remote management system 164 to differentiate the inbound communications from the outbound communications.

Embodiments of the present invention may enable a vending machine operator to remotely monitor the communication between an audit system and a VMC in order to diagnose and repair communication failures. When audit systems are retrofitted to existing vending machine systems, it may not be immediately apparent that a potential communication problems may exist. Thus, it would be desirable to be able to correct these problems remotely by monitoring the data passed between the VMC and the audit system and transmitting new code for use by the audit control system 150. This new code will enable the audit control system 150 to effectively communicate with the VMC 110. The correction of these communication problems can be performed long after the service technician has left the location of the vending machine. This can help to decrease the frequency of service visits by technicians and can eliminate the need for highly-skilled technicians to visit the vending machine in order to perform this diagnosis and repair.

While the invention has been described in terms of particular embodiments and illustrative figures, those of ordinary skill in the art will recognize that the invention is not limited to the embodiments or figures described. For example, in many of the embodiments described above, the audit system is installed in a vending machine system having a product storage region comprising a plurality of coils. It will be understood that the vending machine system may comprise any type of point-of-sale device including cash registers and the like, and need not be limited to only those devices that deliver tangible products to customers.

In addition, the audit system described above communicates with the VMC according to the DEX protocol. In other embodiments, different types of communication protocols may be used. For example, the audit system may utilize the European Vending Association Data Transfer Standard (EVA DTS), which is a protocol similar to the DEX standard for governing the storage and transfer of vending machine data.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of operating a vending machine system comprising a vending machine controller (VMC) and an audit system, comprising:

storing a communications log of communications between the VMC and the audit system, wherein said communications log comprises a plurality of messages exchanged between the VMC and the audit system, each message including handshake data and payload data; and transmitting the communications log to a host system via a wide area network (WAN).

2. The method of claim 1, wherein:

said communications log comprises all data transmitted between the VMC and the audit system for a period of time.

3. The method of claim 1, wherein:

said communications log comprises a Data Exchange (DEX) file transmitted by the VMC to the audit system.

4. The method of claim 1, wherein:

said communications log comprises data corresponding to a failed communication attempt between the VMC and the audit system.

5. The method of claim 1, wherein:

said storing the communications log is performed in response to detection of a communication failure between the VMC and the audit system.

6. The method of claim 1, wherein:

said storing the communications log is performed in response to receipt of a command from the host system to store the communications log.

7. The method of claim 1, further comprising:

receiving code via the WAN for execution by the audit system.

8. The method of claim 7, further comprising:

executing the code to effectuate communication between the audit system and the VMC.

9. The method of claim 7, further comprising:

executing the code to effectuate parsing of an operational data file received by the audit device from the VMC.

10. The method of claim 9, wherein:

said operational data file comprises a DEX file.

11. The method of claim 1, wherein:

said transmitting the communications log comprises transmitting the communications log over a wireless link to the host system.

12. An audit system for a vending machine system, comprising:

an interface for communication with a vending machine controller (VMC);

a control system configured to communicate with the VMC and to store a communications log of communications between the VMC and the audit system, wherein said control system is configured to store in the communications log a plurality of messages exchanged between the VMC and the audit system, each message including handshake data and payload data; and a communications interface for transmitting the communications log to a host system via a wide area network (WAN).

13. The system of claim 12, wherein:

said control system is configured to store all data transmitted between the VMC and the audit system for a period of time in the communications log.

14. The system of claim 12, wherein:

said communications log comprises a DEX file transmitted by the VMC to the control system.

15. The system of claim 12, wherein:

said communications log comprises data corresponding to a failed communication attempt between the VMC and the control system.

16. The system of claim 12, wherein:

said control system is configured to store the communications log in response to detection of a communication failure between the VMC and the control system.

17. The system of claim 12, wherein:

said control system is configured to store the communications log in response to receipt of a command from the host system to store the communications log.

18. The system of claim 12, wherein:

said control system is configured to receive code via the WAN for execution by the audit system.

19. The system of claim 18, wherein:

said control system is configured to execute the code to effectuate communication between the control system and the VMC.

20. The system of claim 18, wherein:

said control system is configured to execute the code to effectuate parsing of an operational data file received by the audit device from the VMC.

21. The system of claim 20, wherein:

said operational data file comprises a DEX file.

22. The system of claim 12, wherein:

said communications interface comprises a wireless communications interface.

23. An audit system for a vending machine system, comprising:

an interface for communication with a vending machine controller (VMC);

a control means for communicating with the VMC and for storing a communications log of communications between the VMC and the control means, wherein said control means is configured to store in the communication log a plurality of messages exchanged between the VMC and the audit system, each message including handshake data and a load data; and a communications means for transmitting the communications log to a host system via a wide area network (WAN).

24. The system of claim 23, wherein:

said control means is configured to store all data transmitted between the VMC and the control means for a period of time in the communications log.

25. The system of claim 23, wherein:

said communications log comprises a DEX file transmitted by the VMC to the control means.

26. The system of claim 23, wherein:

said communications log comprises data corresponding to a failed communication attempt between the VMC and the control means.

27. The system of claim 23, wherein:

said control system is configured to store the communications log in response to detection of a communication failure between the VMC and the control means.

28. The system of claim 23, wherein:

said control means is configured to store the communications log in response to receipt of a command from the host system to store the communications log.

29. The system of claim 23, wherein:

said control means is configured to receive code via the WAN for execution by the control means.

30. The system of claim 29, wherein:

said control means is configured to execute the code to effectuate communication between the control means and the VMC.

31. The system of claim 29, wherein:

said control means is configured to execute the code to effectuate parsing of an operational data file received by the control means from the VMC.

32. The system of claim 31, wherein:

said operational data file comprises a DEX file.

33. The system of claim 23, wherein:

said communications means comprises a wireless communications interface.

* * * * *